UNITED STATES PATENT OFFICE.

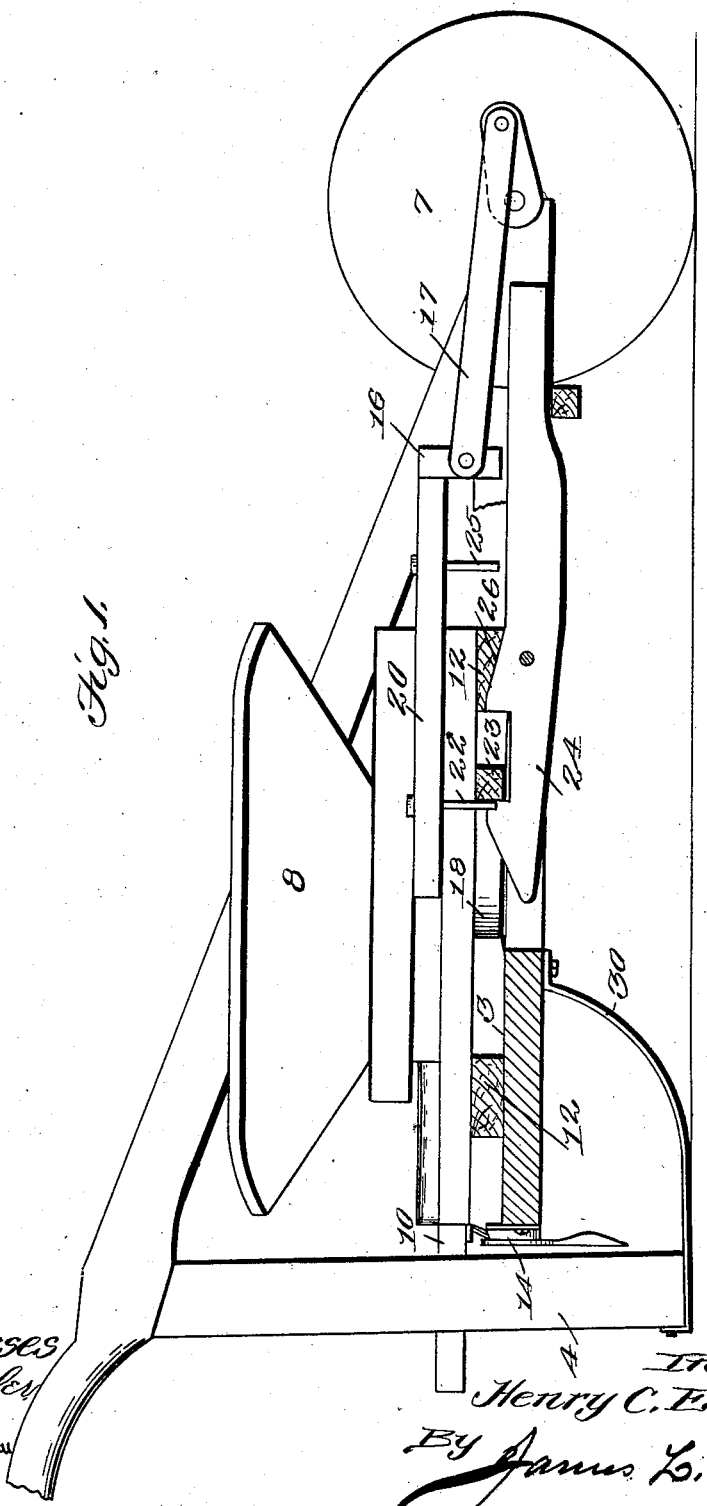

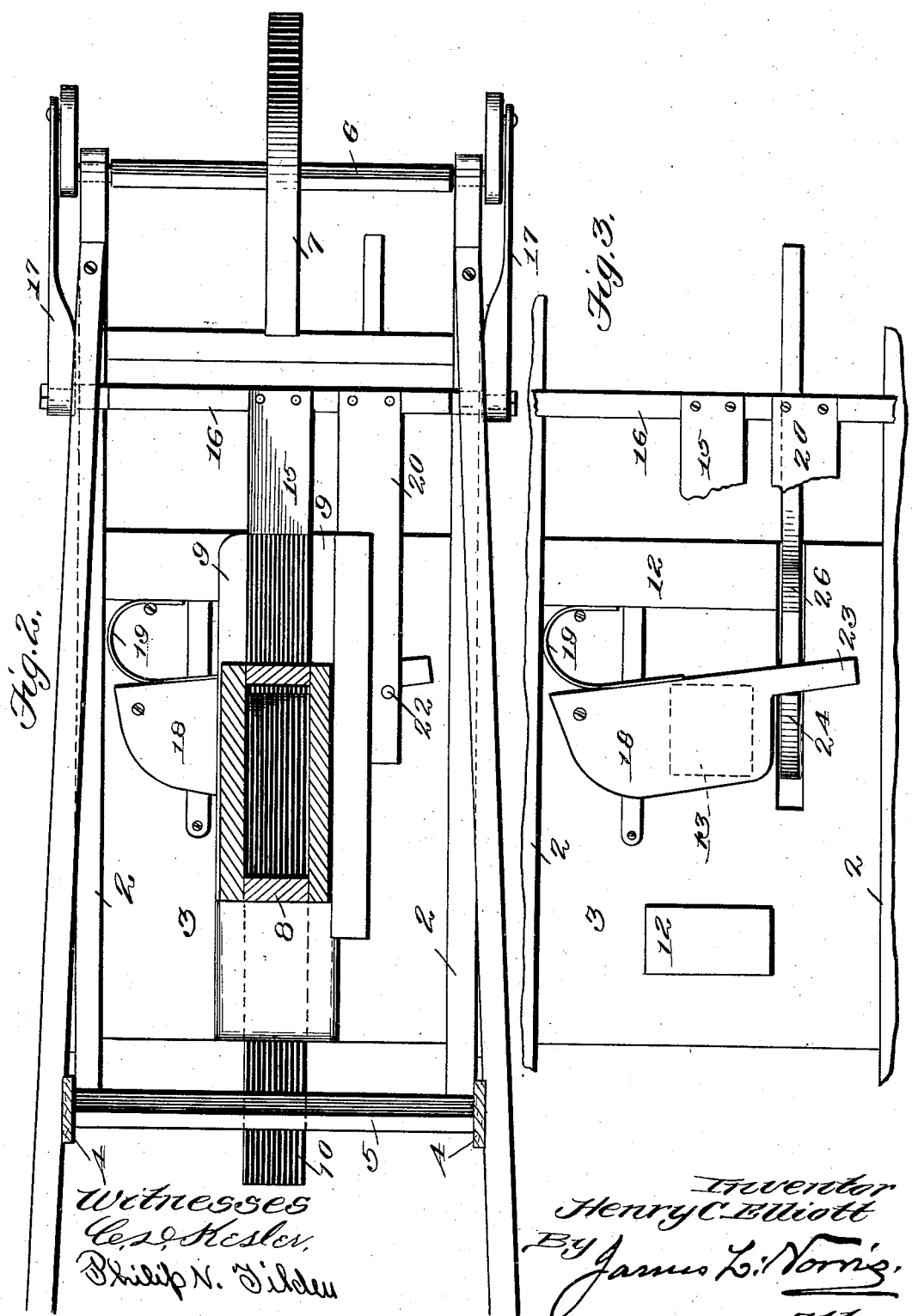

HENRY C. ELLIOTT, OF COUSHATTA, LOUISIANA, ASSIGNOR OF THREE-FOURTHS TO W. H. ELLIOTT, J. D. HUNTER, AND W. A. LONG, OF PARISH OF RED RIVER, LOUISIANA.

DISTRIBUTER FOR FERTILIZERS.

SPECIFICATION forming part of Letters Patent No. 685,119, dated October 22, 1901.

Application filed July 8, 1901. Serial No. 67,465. (No model.)

*To all whom it may concern:*

Be it known that I, HENRY C. ELLIOTT, a citizen of the United States, residing at Coushatta, in the parish of Red River and State of Louisiana, have invented new and useful Improvements in Distributers for Fertilizers, of which the following is a specification.

This invention relates to a distributer for fertilizers; and the object of the invention is to provide a simple and efficient device of this character capable of positively and uniformly distributing fertilizers without waste.

The improved fertilizer-distributer includes as one of its essential features a traction-wheel, a hopper for containing the fertilizer, and fertilizer-distributing mechanism operable by said traction-wheel, and these several elements may be of any suitable kind, though I shall hereinafter describe a desirable arrangement for carrying out the necessary functions.

The invention also involves other advantageous features, which, with the foregoing, will be set forth at length in the following description, while the novelty of said invention will be covered in the appended claims.

The invention is clearly represented in the accompanying drawings, forming a part of this specification, and in which—

Figure 1 is a sectional side elevation of a fertilizer-distributer embodying my invention in one simple and convenient adaptation thereof. Fig. 2 is a sectional top plan view of said distributer. Fig. 3 is a top plan view of the deck or platform with certain of the parts supported thereby.

Like characters refer to like parts.

The framework for sustaining the different parts of the machine may be of any suitable kind. It is represented as including the parallel side bars 2 and a platform or deck, as 3, connecting the said side bars, and this deck or platform sustains the fertilizer-containing hopper. To the rear end of the side bars are fastened legs, as 4, adapted to rest upon the ground when the apparatus is not in use and which extend above said side bars, and to the upper ends thereof braces, as 5, are attached, the braces being furnished with handles by which the device may be propelled and extending forward and downward and being suitably secured to the upper sides of the side bars 2, near the forward end thereof.

The side bars 2 support in suitable bearings a shaft or axle, as 6, to which is fastened a traction-wheel, as 7. By removing this wheel and substituting therefor one of a different size the interval between delivery of the fertilizer can be regulated, the feed of such fertilizer being automatically controlled by this traction-wheel as it rolls along the ground, as will hereinafter appear.

The fertilizer, which is intermittently discharged onto the ground, may be of any suitable kind, and I may place any desirable amount of the same within a hopper, as 8, supported by the parallel bars 9, which act as an effective guide for a slidable regulator or cut-off, as 10, hereinafter described. These guide-bars 9 are supported by the transverse spacing-blocks 12, secured to the upper side of the deck or platform 3, which latter has an enlarged slot or opening, as 13, through which the fertilizer is finally discharged.

The slide 10 controls the discharge-outlet of the hopper, and by moving the same backward or forward the effective area of the outlet, and hence the quantity of material discharged, can be governed, and the slide can be maintained firmly in an adjusted position by means of a suitable detent, as 14.

In conjunction with the hopper 8 I provide two shutters, one located above the other, the upper one when opened or retracted permitting a given amount of fertilizer to drop onto the lower one and the latter when actuated distributing the charge onto the ground through the opening or slot 13. The upper shutter is denoted by 15, and it consists of a flat plate or board or equivalent structure slidable across the lower end of the hopper 8 and through a suitable guide-slot in the forward wall thereof and in a plane just above that of the slide 10. The shutter 15 extends rearward from the cross-bar of a horizontally-reciprocative yoke, as 16, the side members of which are pivoted to cranks, as 17, on the axle or shaft 6, so that on the rotation of the latter as the machine moves over the ground the yoke will be moved back and forth, and hence a corresponding action takes place with respect to the slide 15 to release and cut off in alternation the granular fertilizer. As the sliding shutter 15 is moved forward the material falls onto a second shutter or distributer proper, as 18, located under said shutter 15. The shutter 18 is of the pivoted type, its center of motion being at one side of the hopper 8, and the shutter 18 is so operated that on the forward movement of the shutter 15 it is carried therewith, so as to cover the opening 13 and bring it under the discharge-opening of the hopper 8. The upper shutter or slide 15 is then moved rearward, and when it closes the discharge-opening of the hopper the shutter 18 will be operated by a spring or suitable device which had been held out of action by a latch. When this latch is tripped, the shutter 18 will be thrust rearwardly, and as it does so the mass of fertilizer will be quickly spilled therefrom and onto the ground. To the forward side of the swinging shutter 18 one branch of a U-shaped spring, as 19, is attached, while the other branch of said spring is fastened to the framework, and when this shutter is moved forward the spring is put under compression, at which time the shutter is momentarily latched. As soon as the latch is tripped the shutter by the action of the relaxing spring is returned to its initial position. A bar, as 20, extends rearwardly from the cross-piece of the yoke 16 and it is sustained by and guided by one of the parallel bars 9 and a like or companion member located above the same and secured to the hopper 8. This bar 20 serves as an actuator for advancing the shutter 18, and subsequently as a trip device for a latch holding said shutter in its advanced position. The bar has at or near its rear end the depending projection 22, adapted to engage an extension, as 23, on the shutter, the operation being such that as the bar 20 moves forward the shutter 18 will be swung in a corresponding direction or until the extension 23 can be engaged by the working end of a latch, as 24. The latch is of the pivoted gravity kind, it having a preponderance of weight forward of its axis, so that when the extension 23 has reached a proper point it will be automatically engaged by the latch and held in a position to close the opening 13. The bar 20 carries forward of the actuating projection 22 a second projection, as 25, adapted to engage the upper surface of a beveled shoulder, as 26, upon the upper side of the latch 24. Just about the time the bar 20 has reached its initial position on the rear stroke thereof the trip device or projection 25 will strike the beveled shoulder 26, so as to lower the working end of the latch 24 sufficiently to carry it free of the extension 23. This releases the spring-actuated shutter 18, the relaxing spring of which returns the same to its primary position, the fertilizer being distributed along the ground.

While the distributer is shown as arranged for propulsion by hand, it is obvious that it may be drawn forward by any other power— horse, for example—the draft appliance for which may be connected in any convenient manner to the vehicle.

The invention may be variously modified within the scope of the appended claims. The framework has fastened to its under side one or more spring-runners, as 30, adapted when the apparatus is being drawn over the ground by a horse to glide over stumps and other obstructions without having to be raised by the operator.

Having described the invention, I claim—

1. In a fertilizer-distributer, a hopper, a traction-wheel, a plurality of shutters one of which is spring-actuated, a latch for holding one of the shutters in a shifted position, and means operative with said wheel for actuating the shutters and for also tripping said latch.

2. In a fertilizer-distributer, a hopper, a traction-wheel, a plurality of superposed shutters controlling the discharge of material from said hopper one of them being pivotally mounted and spring-actuated, means operable by the traction-wheel for operating said spring-actuated shutter, and a latch for engaging said shutter.

3. In a fertilizer-distributer, a hopper, a shutter for said hopper, a latch for engaging said shutter, and means for advancing the shutter into position to be engaged by its latch, and thereafter tripping said latch.

4. In a fertilizer-distributer, a hopper, a shutter for said hopper, a latch for engaging said shutter, a shiftable device having means for advancing the shutter into position to be engaged by said latch and for subsequently tripping said latch, and means for returning the shutter to its initial position.

5. In a fertilizer-distributer, a deck having a slot, a hopper on said deck, two shutters one located above the other and both disposed between the deck and the hopper, the upper shutter when opened serving to cause the discharge of material onto the lower shutter and said lower shutter when operated directing such material through said slot, and means for actuating said shutters in alternation.

6. In a fertilizer-distributer, a deck having a slot, a hopper on said deck, two shutters one located above the other and both disposed between the deck and the hopper, the upper shutter when opened serving to cause the discharge of material onto the lower shutter and said lower shutter when operated directing such material through said slot, a traction-wheel and means governed by said traction-wheel for effecting the alternate operation of said shutters.

7. In a fertilizer-distributer, a hopper, a shutter, a latch for holding the shutter in a shifted position, said latch having a beveled shoulder, a traction-wheel, and means operative with the traction-wheel for engaging said shoulder to trip the latch.

8. In a fertilizer-distributer, a hopper, a plurality of superposed shutters for said hopper, a traction-wheel, a latch for engaging the lower shutter, and a reciprocatory device operable by the traction-wheel carrying two devices, one for actuating the lower shutter and the other for tripping said latch.

In testimony whereof I have hereunto set my hand in presence of two subscribing witnesses.

HENRY C. ELLIOTT.

Witnesses:
   EDWIN ARMISTEAD,
   THOMAS W. NETTLES.